(12) United States Patent
Juneja (10) Patent No.: US 10,321,300 B2
(45) Date of Patent: Jun. 11, 2019

(54) METHODS, SYSTEMS, AND COMPUTER READABLE MEDIA FOR PROVIDING END-TO-END PRIORITY SERVICE IN LONG TERM EVOLUTION (LTE) OR SUBSEQUENT GENERATION NETWORKS

(71) Applicant: Oracle International Corporation, Redwood Shores, CA (US)

(72) Inventor: Rohit Juneja, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 337 days.

(21) Appl. No.: 15/217,899

(22) Filed: Jul. 22, 2016

(65) Prior Publication Data
US 2017/0347368 A1 Nov. 30, 2017

(30) Foreign Application Priority Data
May 26, 2016 (IN) .............................. 201641018071

(51) Int. Cl.
*H04W 72/12* (2009.01)
*H04W 8/18* (2009.01)
(Continued)

(52) U.S. Cl.
CPC ............. *H04W 8/18* (2013.01); *H04W 76/12* (2018.02); *H04W 8/06* (2013.01)

(58) Field of Classification Search
None
See application file for complete search history.

(56) References Cited

U.S. PATENT DOCUMENTS 6,819,652 B1   11/2004   Akhtar et al.
6,865,153 B1   3/2005    Hill et al.
(Continued)

FOREIGN PATENT DOCUMENTS

CN          101494608 A      7/2009
CN   ZL 201180018952.0       5/2016
(Continued)

OTHER PUBLICATIONS

Notification of Transmittal of the International Search Report and the Written Opinion of the International Searching Authority, or the Declaration for International Patent Application No. PCT/US2017/066331 (dated Mar. 8, 2018).

(Continued)

*Primary Examiner* — Kenny S Lin
(74) *Attorney, Agent, or Firm* — Jenkins, Wilson, Taylor & Hunt, P.A.

(57) ABSTRACT

The subject matter described herein includes methods, systems, and computer readable media for supporting end-to-end priority service in LTE or subsequent generation networks. One method for supporting such priority occurs at a network node configured to operate in an LTE or subsequent generation network. The method includes receiving an incoming message associated with a communications session or transaction in the network. The message includes an end-to-end priority user indicator identifying a user associated with the session or transaction as a priority user. The method optionally includes storing an association between the end-to-end priority user indicator and the session or transaction. The method further includes treating the session with a priority corresponding to the end-to-end priority user indicator. The method further includes including the end-to-end priority user indicator in subsequent messages trans- (Continued)

mitted by the network node that are associated with the same session or transaction as the received message.

20 Claims, 3 Drawing Sheets

(51) Int. Cl.
    *H04W 76/12*    (2018.01)
    *H04W 8/06*     (2009.01)

(56) References Cited

U.S. PATENT DOCUMENTS

| | | | |
|---|---|---|---|
| 7,333,438 | B1 | 2/2008 | Rabie et al. |
| 7,532,647 | B2 | 5/2009 | Eichler et al. |
| 7,636,362 | B2 | 12/2009 | Singh et al. |
| 7,822,023 | B2 | 10/2010 | Lahetkangas et al. |
| 7,827,256 | B2 | 11/2010 | Phillips et al. |
| 8,644,324 | B2 | 2/2014 | Kanode et al. |
| 2002/0087723 | A1 | 7/2002 | Williams et al. |
| 2003/0095536 | A1 | 5/2003 | Hu et al. |
| 2004/0098612 | A1 | 5/2004 | Lee et al. |
| 2007/0076600 | A1 | 4/2007 | Ekl et al. |
| 2008/0186852 | A1 | 8/2008 | Sami et al. |
| 2008/0212576 | A1 | 9/2008 | O'Neill |
| 2009/0080440 | A1 | 3/2009 | Balyan et al. |
| 2009/0232011 | A1 | 9/2009 | Li et al. |
| 2009/0296688 | A1 | 12/2009 | Bakker et al. |
| 2009/0319686 | A1 | 12/2009 | Watanabe |
| 2010/0017846 | A1 | 1/2010 | Huang et al. |
| 2010/0135287 | A1 | 6/2010 | Hosain et al. |
| 2010/0255826 | A1* | 10/2010 | Brewer ................ H04W 4/10 455/414.1 |
| 2011/0090902 | A1 | 4/2011 | Jung |
| 2011/0116382 | A1* | 5/2011 | McCann ............ H04L 63/0263 370/241 |
| 2011/0195710 | A1* | 8/2011 | Nas .................... H04W 8/18 455/432.3 |
| 2011/0200053 | A1 | 8/2011 | Kanode et al. |
| 2012/0224677 | A1* | 9/2012 | Riley ................. H04L 12/1407 379/93.01 |
| 2013/0223222 | A1* | 8/2013 | Kotecha ............. H04L 43/0882 370/235 |
| 2014/0365684 | A1 | 12/2014 | Mann |
| 2015/0127759 | A1* | 5/2015 | Siegel .................. H04L 51/26 709/207 |
| 2015/0222489 | A1 | 8/2015 | Perez Martinez et al. |
| 2016/0156748 | A1* | 6/2016 | Yang ................... H04L 47/24 370/328 |
| 2016/0227457 | A1* | 8/2016 | Tanaka ................ H04W 8/04 |
| 2018/0123950 | A1 | 5/2018 | Garg et al. |
| 2018/0146503 | A1* | 5/2018 | Castro Castro ... H04W 28/0215 |
| 2018/0176141 | A1 | 6/2018 | Gupta et al. |

FOREIGN PATENT DOCUMENTS

| | | |
|---|---|---|
| EP | 2 534 793 | 1/2018 |
| WO | WO 2009/070179 A1 | 6/2009 |
| WO | WO 2011/100600 A2 | 8/2011 |
| WO | WO 2018/112158 | 6/2018 |

OTHER PUBLICATIONS

Vencore Labs et al., "Support for Signaling Transport Level Packet Marking," 3GPP Draft; C4-173152 Support for DSCP Marking 29.283 Rel14, 3rd Generation Partnership Project (3GPP), V14.1.0, pp. 1-3 (May 15, 2017).

Commonly-assigned, co-pending U.S. Appl. No. 15/382,057 for "Methods, Systems, and Computer Readable Media for Priority Routing of Diameter Messages," (Unpublished, filed Dec. 16, 2016).

Donovan, S., "Diameter Routing Message Priority," IETF RFC 7944, Oracle, pp. 1-18 (Aug. 2016).

"Universal Mobile Telecommunications System (UMTS); LTE; Characteristics of the Universal Subscriber Identity Module (USIM) application," ETSI TS 131 102, 3GPP TS 31.102 verstion 13.3.0 Release 13, pp. 1-277 (Apr. 2016).

Letter Regarding Notification of Grant for Chinese Patent Application No. 201180018952.0 (dated Mar. 1, 2016).

Notification of the Third Office Action for Chinese Application No. 201180018952.0 (dated Sep. 15, 2015).

Second Office Action for Chinese Patent Application No. 201180018952.0 (dated Feb. 16, 2015).

First Office Action for Chinese Patent Application No. 201180018952.0 (dated Jun. 26, 2014).

Extended European Search Report for European Application No. 11742905.0 (dated Dec. 11, 2013).

Notice of Allowance and Fee(s) Due for U.S. Appl. No. 13/026,060 (dated Sep. 25, 2013).

Final Office Action for U.S. Appl. No. 13/026,060 (dated May 10, 2013).

Communication of European Publication Number and Information on the Application of Article 67(3) EPC for European Patent Application No. 11742905.0 (dated Nov. 21, 2012).

Farjardo et al., "Diameter Base Protocol," RFC 6733, pp. 1-153 (Oct. 2012).

Non-Final Official Action for U.S. Appl. No. 13/026,060 (dated Sep. 19, 2012).

Notification of Transmittal of the International Search Report and the Written Opinion of the International Searching Authority, or the Declaration for International Application No. PCT/US2011/024611 (dated Oct. 20, 2011).

"3rd Generation Partnership Project; Technical Specification Group Services and System Aspects; General Packet Radio Service (GPRS) enhancements for Evolved Universal Terrestrial Radio Access Network (E-UTRAN) access (Release 10)," Technical Specification, 3GPP TS 23.401 V10.4.0, pp. 1-281(Jun. 2011).

"LTE; Evolved Universal Terrestrial Radio Access Network (E-UTRAN); S1 Application Protocol (S1AP) (3GPP TS 36.413 version 10.2.0)," ETSI TS 136 413 V10.2.0, pp. 1-259 (Jun. 2011).

"3rd Generation Partnership Project; Technical Specification Group Core Network and Terminals; Organization of subscriber data (Release 9)," Technical Specification, 3GPP TS 23.008 V9.3.0, pp. 1-97 (Jun. 2010).

3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).

Tsou et al., "Realm-Based Redirection in Diameter," Internet Engineering Task Force, draft-ietf-dime-realm-based-redirect-02, pp. 1-7 (Oct. 27, 2009).

3GPP, "3rd Generation Partnership Project; Technical Specification Group core Network and Terminals; Generic Authentication Architecture (GAA); Zh and Zn Interfaces Based on the Diameter Protocol; Stage 3 (Release 8)," 3GPP TS 29.109 V8.3.0 (Sep. 2009).

3GPP, "3rd Generation Partnership Project; Technical Specification Group Core Network and Terminals; Numbering, Addressing and Identification (Release 8)," 3GPP TS 23.003 V8.6.0 (Sep. 2009).

Jones et al., "Diameter Extended NAPTR," Internet-Draft, draft-jones-dime-extended-naptr-00, pp. 1-8 (Aug. 23, 2009).

Korhonen et al., "Diameter User-Name and Realm Based Request Routing Clarifications," Internet-Draft, draft-ietf-dime-nai-routing-03.txt, pp. 1-11 (Aug. 19, 2009).

3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 8)," ETSI TS 129.272 V8.3.0 (Jun. 2009).

3GPP, "3rd Generation Partnership Project; Technical Specification Group Core Network and Terminals; Diameter-based Protocols Usage and Recommendations in 3GPP (Release 8)," 3GPP TR 29.909 V8.1.2 (Jan. 2009).

"3rd Generation Partnership Project; Technical Specification Group Core Network and Terminals; 3GPP Evolved Packet System (EPS); Evolved General Packet Radio Service (GPRS) Tunnelling Protocol (56) References Cited

OTHER PUBLICATIONS for Control plane (GTPv2-C); Stage 3 (Release 8)," 3GPP TS 29.274 V8.0.0, pp. 1-131 (Dec. 2008).
"3rd Generation Partnership Project; Technical Specification Group Services and System Aspects; Priority service guide; (Release 8)," 3GPP TR 22.952 V8.0.0, pp. 1-53 (Dec. 2008).
"3rd Generation Partnership Project; Technical Specification Group Radio Access Network; Evolved Universal Terrestrial Radio Access (E-UTRA) Radio Resource Control (RRC); Protocol specification (Release 8)," 3GPP TS 36.331 V8.0.0, pp. 1-56 (Dec. 2007).
Aboba et al., "The Network Access Identifier," Network Working Group, RFC 4282, pp. 1-17 (Dec. 2005).
Calhoun et al., "Diameter Mobile IPv4 Application," Network Working Group, RFC 4004, pp. 1-50 (Aug. 2005).
Aboba et al., "Authentication, Authorization and Accounting (AAA) Transport Profile," Network Working Group, RFC 3539, pp. 1-39 (Jun. 2003).
Black et al., "Per Hop Behavior Identification Codes," Network Working Group, RFC 3140, pp. 1-8 (Jun. 2001).
Heinanen et al., "Assured Forwarding PHB Group," Network Working Group, RFC 2597, pp. 1-12 (Jun. 1999).
Jacobson et al., "An Expedited Forwarding PHB," Network Working Group, RFC 2598, pp. 1-12 (Jun. 1999).
Blake et al., "An architecture for Differentiated Services," Network Working Group, RFC 2475, pp. 1-37 (Dec. 1998).
Nichols et al., "Definition of the Differentiated Services Field (DS Field) in the IPv4 and IPv6 Headers," Network Working Group, RFC 2474, pp. 1-21 (Dec. 1998).
Deering et al., "Internet Protocol, Version 6 (IPv6) Specification," Networking Working Group, RFC 2460, pp. 1-40 (Dec. 1998).
Ravikumar et al., "Star-Graph Based Multistage Interconnection Network for ATM Switch Fabric," Parallel and Distributed Processing, pp. 1-8 (Oct. 26, 1994).
Postel, "Service Mappings," Network Working Group, RFC 795, pp. 1-6 (Sep. 1981).
"Internet Protocol: Darpa Internet Program Protocol Specification," Information Sciences Institute, RFC 791, pp. 1-97 (Sep. 1981).
Communication under Rule 71(3) EPC of Intention to Grant for European Patent Application No. 11 742 905.0 (dated Aug. 30, 2017).
Decision to grant a European patent pursuant to Article 97(1) EPC for European Patent Application No. 11742905.0 (dated Dec. 21, 2017).
Notification of Transmittal of the International Search Report and the Written Opinion of the International Searching Authority, or the Declaration for International Application No. PCT/US2017/032919 (dated Jul. 25, 2017).
Communication pursuant to Article 94(3) EPC for European Patent Application No. 11 742 905.0 (dated Dec. 21, 2016).
"3rd Generation Partnership Project; Technical Specification Group Services and System Aspects; IP Multimedia Subsystem (IMS); Stage 2 (Release 13)," 3GPPP TS 23.228, V13.5.0, pp. 1-314 (Mar. 2016).
Change Request for 3GPP TS 29.272, "Support of the Session-Priority AVP over S6a Interface," version 13.2.0, 3GPP, C4-151285 Vancouver, Canada, pp. 1-22 (Aug. 17-21, 2015).
Non-Final Office Action for U.S. Appl. No. 15/382,057 (dated Jul. 19, 2018).
Applicant-Initiated Interview Summary for U.S. Appl. No. 15/382,057 (dated Oct. 30, 2018).
First Examination Report for Indian Patent Application Serial No. 6919/CHENP/2012 (dated Sep. 25, 2018).

* cited by examiner

METHODS, SYSTEMS, AND COMPUTER READABLE MEDIA FOR PROVIDING END-TO-END PRIORITY SERVICE IN LONG TERM EVOLUTION (LTE) OR SUBSEQUENT GENERATION NETWORKS

PRIORITY CLAIM

This application claims the priority benefit of Indian patent application number 201641018071, filed May 26, 2016, the disclosure of which is incorporated herein by reference in its entirety.

TECHNICAL FIELD

The subject matter described herein relates to providing priority service in communications networks. More particularly, the subject matter described herein relates to methods, systems, and computer readable media for providing end-to-end priority service in long term evolution (LTE) or subsequent generation networks.

BACKGROUND

In emergency situations, such as terrorist attacks, natural or man-made disasters, etc., mobile communications networks can become overwhelmed with high volumes of user traffic. As a result, network resources may be unavailable for important personnel, such as public safety officials, government officials, etc. Because it is desirable for communications from such high priority users to be given precedence in emergency situations, the mobile communications network needs to provide a mechanism for prioritizing communications associated with these users.

Third generation and landline networks include mechanisms for prioritizing communications involving priority users. However, 4G LTE networks do not currently provide a suitable solution for prioritizing communications on an end-to-end basis for high priority users.

Existing proposals for prioritizing communications are typically on a per-interface basis. In addition, there is no standardized procedure for mapping a priority parameter on one interface to a priority parameter on another interface. Another problem associated with some message priority parameters is that a priority parameter can be located in an information element that is many levels deep in the message, requiring excessive parsing by the receiving node to determine the message priority.

In light of at least these difficulties, there exists a need for support for end-to-end priority service in LTE and subsequent generation networks.

SUMMARY

The subject matter described herein includes methods, systems, and computer readable media for supporting end-to-end priority service in LTE or subsequent generation networks. One method for supporting such priority occurs at a network node configured to operate in an LTE or subsequent generation network. The method includes receiving an incoming message associated with a communications session or transaction in the network. The message includes an end-to-end priority user indicator identifying a user associated the session or transaction as a priority user. The method optionally includes storing an association between the end-to-end priority user indicator and the session or transaction. The method further includes treating the session with a priority corresponding to the end-to-end priority user indicator. The method further includes including the end-to-end priority user indicator in subsequent messages transmitted by the node that are associated with the same session or transaction.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for providing end-to-end priority service for LTE or subsequent generation networks. Rather than using a message priority parameter, such as the ARP or QCI, the subject matter described herein utilizes an end-to-end priority user indicator that identifies a user as a high priority user and that is recognized as a priority user indicator by each node in the network that receives messages including the indicator. Some nodes that receive a message including the end-to-end priority user indicator may store an association between the end-to-end priority user indicator and the session or transaction with which the end-to-end priority user is associated. The end-to-end priority user indicator may also be stored at a location in a message that does not require deep parsing to access the indicator. For example, the end-to-end priority user indicator may be stored in a message header or in an AVP or IE with level 1 depth.

In addition to carrying the end-to-end priority user indicator, messages may optionally carry an end-to-end priority level indicator. The end-to-end priority level indicator may be used to determine priority among session messages associated with different sessions or transactions that have the same end-to-end priority user indicator. Providing multiple levels of end-to-end priority indicators is intended to be within the scope of the subject matter described herein.

Unlike emergency services solutions that rely on the international mobile station identifier (IMSI) or mobile services ISDN (MSISDN) number to be translated to a message priority, subject matter described herein includes an end-to-end priority user indicator that is distinct from the IMSI or MSISDN and that is universally recognized in the network as a priority user indicator. The end-to-end priority user indicator is dedicated to identifying a user as a priority user. Different nodes may map such a parameter to message priority, but the end-to-end priority user indicator has at least one value that is universally recognized as denoting a priority user and at least another value different from the first value that is universally recognized as designating a non-priority user. An end-to-end priority user indicator having plural possible values that respectively denote multiple different levels of priority users are also within the scope of the subject matter described herein.

Figure 1:
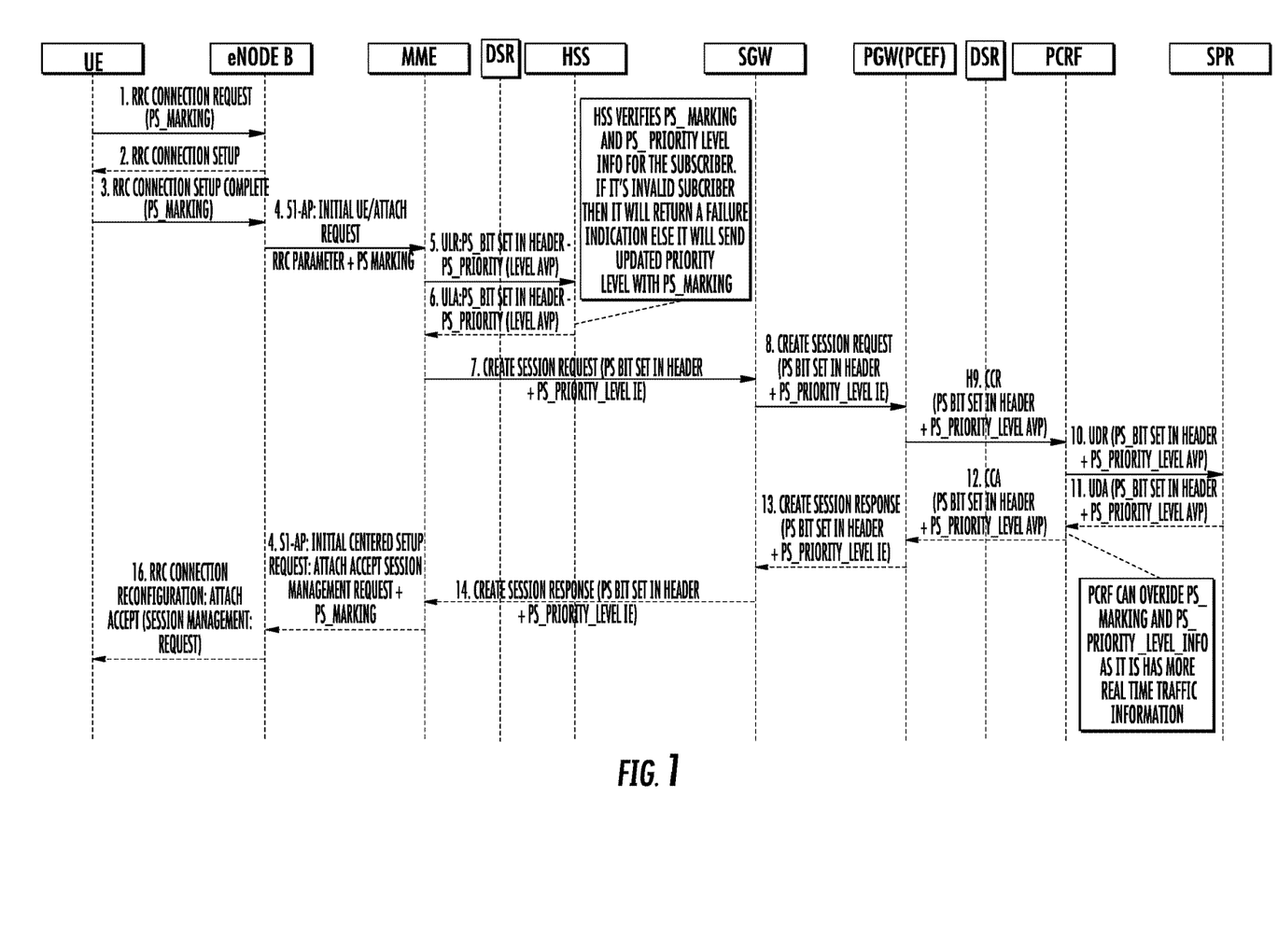
FIG. 1 is a message flow illustrating a message flow for providing end-to-end priority service in LTE or subsequent generation networks according to an embodiment of the subject matter described herein.

FIG. 1 is a message flow diagram illustrating exemplary messages exchanged between LTE network nodes for supporting end-to-end priority service according to an embodiment of the subject matter described herein. Referring to FIG. 1, it is assumed that a user equipment (UE) includes a universal subscriber identity module (USIM) that is configured with an end-to-end priority user indicator illustrated in the diagram as PS_Marking and optional priority level information. In line 1 of the message flow diagram, the UE sends its PS_Marking information to the eNode B an in RRC connection request message. Along with the PS_Marking information, the RRC message may also include an establishment cause parameter indicating priority access. Upon receipt of this message, in line 2, the eNode B generates an RRC connection setup message. The eNode B may optionally include the end-to-end priority user indicator in the RRC connection setup message. In line 3 of the message flow diagram, the UE sends an RRC connection setup complete message that includes the end-to-end priority user indicator.

In line 4 of the message flow diagram, in response to receiving the RRC connection setup complete message with the end-to-end priority user indicator, the eNode B sends an S1-AP initial attach request message to the MME. The initial attach request message includes the end-to-end priority user indicator and the priority level information received in the RRC connection request message. The MME stores the association between the end-to-end priority user indicator and the transaction and formulates and sends update location request (ULR) message to the HSS (line 5). The ULR message includes the end-to-end priority user indicator and the priority level information.

The update location request message in FIG. 1 includes the end-to-end priority user indicator. As such, the HSS and nodes between the MME and the HSS may treat the ULR with the indicated priority. In FIG. 1, a Diameter signaling router (DSR) may be located between the MME and the HSS. The Diameter signaling router may receive the ULR message and route the ULR message with a priority corresponding to the priority associated with the end-to-end priority user indicator. The DSR may also store an association between the ULR transaction and the end-to-end priority user indicator so that subsequent messages originated by the DSR associated with the same transaction can also include that parameter. The DSR may then forward the ULR message with the end-to-end priority user indicator to the HSS.

The HSS, in response to receiving the ULR message with the end-to-end priority user indicator, performs a lookup in its subscriber database and locates a record corresponding to the subscriber. The HSS determines that the subscriber should be afforded the priority indicated by the end-to-end priority user indicator based on the priority associated with the user's subscription stored in the record. If the HSS determines that the subscriber should be given the indicated priority, the HSS responds with a ULA message (line 6) with the same end-to-end priority user indicator received in the ULR message. If the HSS determines that the user is not entitled to the indicated priority, the HSS may override the priority in the message and respond with a ULA message with a lower priority than the received priority. The HSS may also override the message priority to give the user a higher priority if the HSS determines that a higher priority is specified by the user's subscription. The HSS sends the ULA message with the indicated priority to the MME.

As with the ULR message, the ULA message may be received by a DSR between the HSS and the MME. The DSR may route the message with a priority corresponding to the end-to-end priority user indicator in the message.

In line 7 of the message flow diagram, the MME generates a create session request message. The create session request message includes the end-to-end priority user indicator and the priority level information. The MME transmits the create session request message to the serving gateway (SGW).

In line 8 of the message flow diagram, the serving gateway sends a Create Session Request message including the end-to-end priority user indicator and the priority level information to the packet gateway (PGW). The serving gateway may also store an indication between the session or transaction and the priority user and priority level information.

In line 9 of the message flow diagram, the packet gateway or policy and charging enforcement function (PCEF) generates a create connection request-initial (CCR-I) message in response to the received create session request message. The packet gateway includes the end-to-end priority user indicator and the priority level information in the CCR-I message. The packet gateway sends the CCR-I message to a policy and charging rules function (PCRF).

A DSR located between the packet gateway and the PCRF may receive the CCR-I message, recognize the end-to-end priority user indicator in the message, and treat the message according to the indicated priority. For example, the DSR may route the message with a priority corresponding to the end-to-end priority user indicator. The DSR may also store an association between the CCR-I transaction and the end-to-end priority user indicator so that the DSR can include the end-to-end priority user indicator in subsequent messages associated with the same transaction that are originated by the DSR. In the illustrated example, the DSR routes the CCR-I message to the PCRF.

The PCRF stores an association between the priority user indicator and the priority level information and a Gx session, so that further messages generated by the PCRF can include the same priority information. In line 10 of the message flow diagram, the PCRF sends a user data request (UDR) message to the subscription profile repository (SPR) communicating the end-to-end priority user indicator and the priority level information to the SPR.

Upon receipt of the UDR message, the SPR may determine whether a different priority than indicated by the priority user indicator and/or the priority level information as the SPR may include more real time traffic information than known by other nodes in the network.

In line 11 of the message flow diagram, the SPR sends a user data answer (UDA) message with the priority user indicator and the priority level information to the PCRF. If the SPR decides to override priority information, then the SPR could send new priority values in the UDA message to the PCRF. The PCRF may then decide whether to accept or override the new priority values received from the SPR. The reason that the PCRF may have the authority/capability to override the priority set by the SPR is that the PCRF may have more real time traffic information than the SPR. In addition, the priority override feature of the PCRF end may be a pre-enabled feature to avoid any dynamic behavior without the network operator's consent.

In line 12 of the message flow diagram, the PCRF sends a create connection answer initial (CCA-I) message with the priority user indicator and priority level information that it received from the SPR. If the SPR does not send any new priority information then the PCRF may continue to use the received priority information. The PCRF sends this message to the packet gateway.

As with the CCR message, the CCA-I message will be received by the DSR and routed with a priority corresponding to the end-to-end priority user indicator.

In line 13 of the message flow diagram, the packet gateway sends a Create Session Response message with the end-to-end priority user indicator and the priority level information that the packet gateway received from the PCRF. The packet gateway sends this message to the serving gateway.

In line 14 of the message flow diagram, the serving gateway sends the Create Session Response including the end-to-end priority user indicator and the priority level information to the MME.

In line 15 of the message from diagram, the MME triggers an S1-AP initial context setup request with the end-to-end priority user indicator and the priority level information to eNode B.

In line 16 of the message flow diagram, the eNode B sends an RRC connection reconfiguration attach accept message to the UE confirming establishment of the session. Thus, by using an end-to-end priority user indicator, each node in the network can identify the user as a priority user and provide supporting end-to-end priority service.

Figure 2:
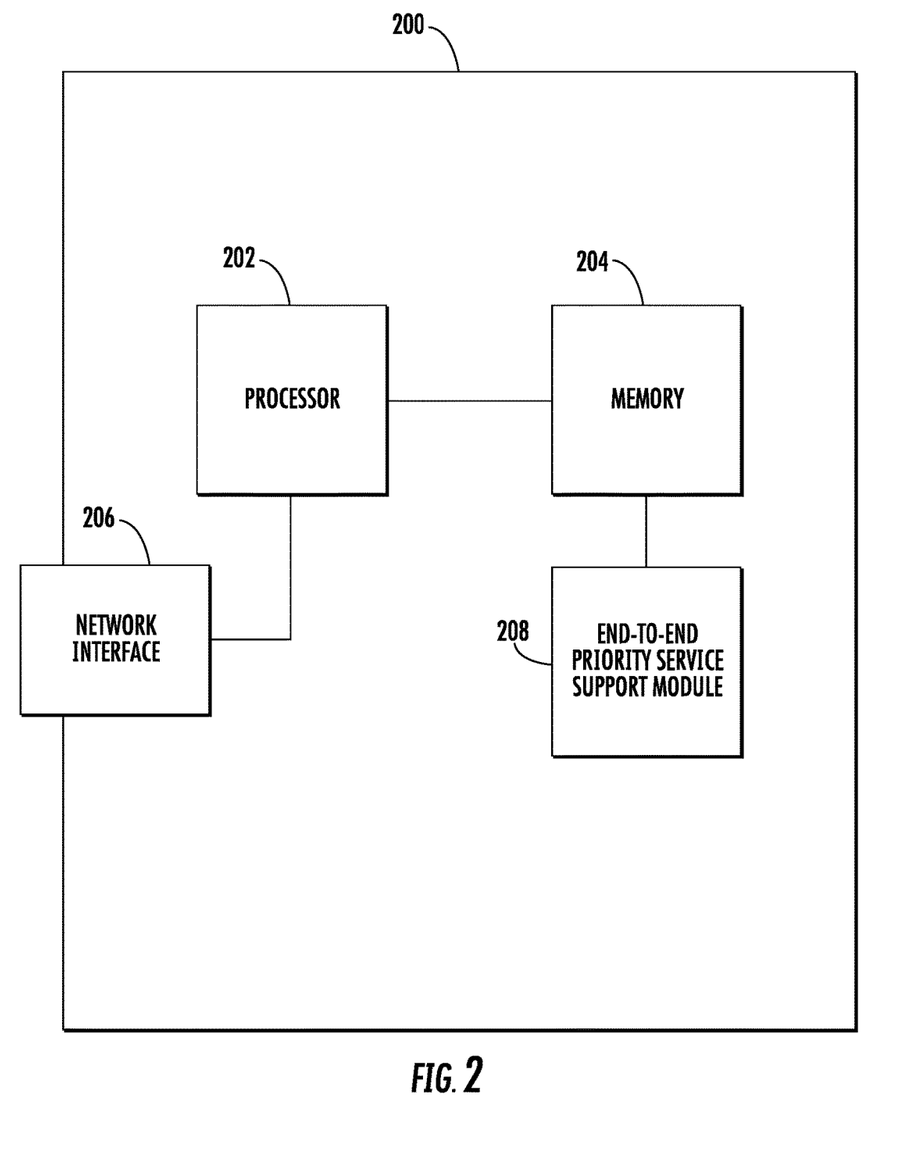
FIG. 2 is a block diagram illustrating an LTE or subsequent generation network node for supporting end-to-end priority service according to an embodiment of the subject matter described herein.

FIG. 2 is a block diagram illustrating an exemplary LTE or subsequent generation network node for supporting end-to-end priority service. Referring to FIG. 2, network node 200 may be any of the nodes illustrated in FIG. 1 or other Diameter, IMS, LTE, or subsequent generation network node. For example, network node 200 may be an eNode B, an MME, a DSR, an HSS, an SGW, a PGW, a PCRF, an SPR, a session border controller (SBC), a proxy call session control function (P-CSCF), an equipment identity register (EIR) or a user data repository (UDR). In the illustrated example, network node 200 includes a processor 202 and memory 204. Network node 200 also includes a network interface 206. Network node 200 further includes an end-to-end priority service support module 208 that performs the functions described herein for supporting end-to-end priority service. For example, end-to-end priority service support module 208 may receive messages via network interface 206, determine the priority user indicator and priority level information in the messages and store an association between a session or transaction and the end-to-end priority user indicator and the priority level indicator in memory 204. End-to-end priority service support module 208 may also ensure that subsequent messages associated with the same session contain the same priority user indicator and priority service indicator. If network node 200 is an HSS or an SPR, end-to-end priority service support module 208 may override the priority user indicator and/or priority level information as described above. End-to-end priority service support module may also ensure that subsequent messages originated by network node 200 associated with the same session or transaction are treated with the priority indicated by the user indicator and/or the priority level information.

Figure 3:
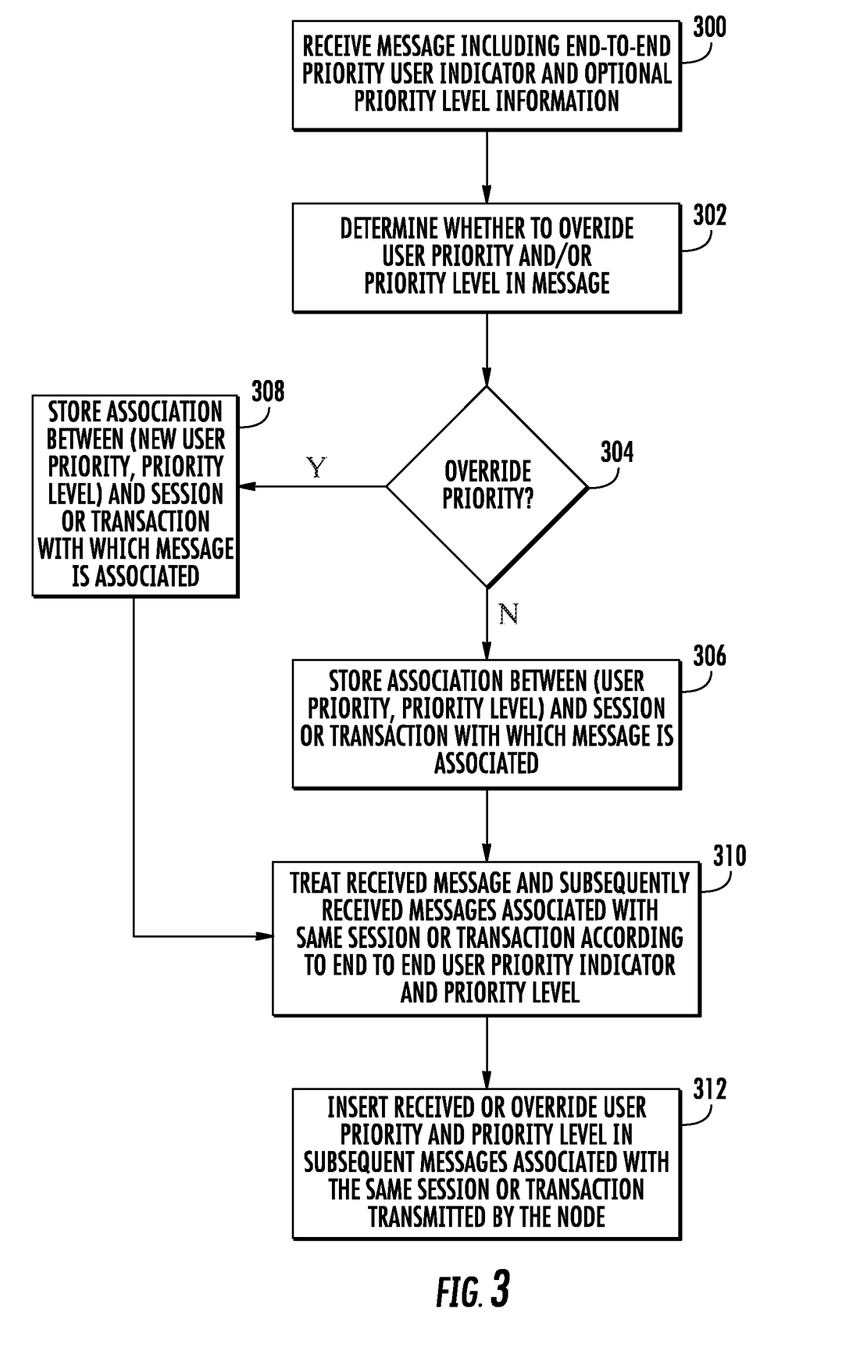
FIG. 3 is a flow chart illustrating an exemplary process performed by a network node for providing or supporting end-to-end priority service for LTE or subsequent generation networks according to an embodiment of the subject matter described herein.

FIG. 3 is a flow chart illustrating an exemplary process for supporting end-to-end priority service in LTE or subsequent generation networks according to an embodiment of the subject matter described herein. Referring to FIG. 3, in step 300, a message is received at a node in a LTE or subsequent generation network. The message may include an end-to-end priority user indicator and optional priority level information. The node may be any of the nodes described with respect to FIG. 1 or 2. In step 302, the node stores an association in between the priority user indicator and a session or transaction with which the message is associated. For example, network node 200 may store the end-to-end priority user indicator and/or priority level information in memory 204 along with an identifier for the transaction or session with which the message is associated. In step 304, it is determined whether the priority associated with the end-to-end priority user indicator should be overruled. Step 304 may be implemented if the receiving node is an HSS, an SPR, or a PCRF. If the node is one of the other nodes without priority override capabilities, step 304 may be omitted, and control proceeds to step 306 where an association between the end-to-end priority user indicator and a session or transaction with which the received message is associate is stored. In step 304, if it is determined that the priority in the message should be overridden, control proceeds to step 308 where an association between the new priority and/or priority level in the session or transaction with which the message is associated is stored.

It should be noted that steps 306 and 308 may be omitted for nodes that do not originate any messaging related to the transaction or session. Such nodes may simply copy the priority user indicator and priority service indicator from inbound messages into outbound messages.

If it is determined that the priority should not be overridden or if priority override is not supported, control proceeds to step 310 where the session or transaction is treated with the priority corresponding to the end-to-end priority user indicator in the message. For example, if the node that receives the message is a DSR, the message may be routed with a priority corresponding to the end-to-end priority user indicator. In step 312, end-to-end priority user indicator is included in subsequent messages associated with the same session or transaction. For example, LTE or subsequent generation network node 200 may include the end-to-end priority user indicator in messages that it formulates relating to the same session or transaction as the message in which the priority user indicator or priority level indicator is subsequently received.

In order to support end-to-end priority service, changes may be made at various network interfaces. A description of exemplary changes that may be made at each network interface or node will now be presented.

USIM Changes for Supporting End-to-End Priority Service

According to one aspect of the subject matter described herein, the USIM must be modified to support priority service. The USIM is a real or virtual card that is stored in a mobile device or UE. Because a USIM contains information for authenticating a user to the network during the user's initial attachment to the network, the USIM is the first device in the chain of devices that may be modified to support end-to-end priority service.

The following three options illustrate exemplary USIM modifications that may be implemented to support end-to-end priority service according to an embodiment of the subject matter described herein.

Option #1: Define a new elementary file (EF) for priority service (PS) marking and priority Level Info. Elementary files are files that carry information and that are stored on the USIM in a UE. The new EF for this option is referred to as $EF_{PS\_MARKING}$, which will carry information regarding a priority subscription from a UE. For example, the $EF_{PS\_MARKING}$ file may carry the end-to-end priority user indicator described herein.

Option #1 may also include a second EF called $EF_{PS\_Priority\_Level\_Info}$ that is used to convey priority level information. If PS_Marking is enabled and priority level information is not defined then network defined priority can be used. The priority information carried in the new elementary files to support priority services would be verified in network. For example, as described above with respect to FIG. 1, the HSS may verify that the user's subscription supports priority service. Also, PS_Marking may be mandatory for PS users but priority level can be optional.

In an alternate implementation, instead of defining an EF with new parameters to support priority service, a new EF that re-uses existing parameters for priority services may be used. This option is referred to below as option #2.

Option #2: Define an EF for PS marking and reuse $EF_{eMLPP}$ for priority level information. In this option, a new elementary file, $EF_{PS\_MARKING}$, may be used to carry the end-to-end priority user indicator, and an existing EF, enhanced multi-level precedence and preemption ($EF_{eMLPP}$) may be used to carry the optional priority level information. Table 1 shown below illustrates the structure of the $EF_{eMLPP}$ elementary file and the portion that may be used to carry priority level information.

TABLE 1

$EF_{eMLPP}$ Structure Used to Carry Priority Level Information for USIM Modification Option #2

| Identifier: '6FB5' | | Structure: Transparent | Optional |
| --- | --- | --- | --- |
| File size: 2 bytes | | Update activity: low | |
| Access Conditions | | | |
| READ | | PIN | |
| UPDATE | | ADM | |
| DEACTIVATE | | ADM | |
| ACTIVATE | | ADM | |
| Bytes | Description | M/O | Length |
| 1 | Priority levels | M | 1 byte |
| 2 | Fast call set-up conditions | M | 1 bytes |

In Table 1, byte 2 of the $EF_{eMLPP}$ elementary file may carry the priority level information. As with option #1, the priority user and priority level information carried in the EFs for option #2 may be verified by the network as well. For example, the HSS may confirm whether or not the user is entitled to the priority carried in USIM EFs and may override the priority if the user is not entitled to the priority specified in the EFs.

In yet another option, the $EF_{eMLPP}$ elementary file may be modified to carry priority user information and priority level information. Table 2 shown below illustrates exemplary modifications to the $EF_{eMLPP}$ elementary file for option #3.

TABLE 2

$EF_{eMLPP}$ Modifications to Carry Priority User and Priority Level Information for Option #3

| Identifier: '6FB5' | | Structure: Transparent | Optional |
| --- | --- | --- | --- |
| File size: 3 bytes | | Update activity: low | |
| Access Conditions | | | |
| READ | | PIN | |
| UPDATE | | ADM | |
| DEACTIVATE | | ADM | |
| ACTIVATE | | ADM | |
| Bytes | Description | M/O | Length |
| 1 | Priority levels | M | 1 byte |
| 2 | Fast call set-up conditions | M | 1 bytes |
| 3 | PS Marking | M | 1 byte |

In Table 2, it can be seen that the size of the $EF_{eMLPP}$ elementary file has been increase to three bytes with the third byte carrying the end-to-end priority user information. The priority level information can be carried in the existing priority level parameter (byte 1). As with options #1 and #2, the priority user and priority level information in option #3 may be verified by the network to ensure that the user is entitled to the USIM-specified priority.

Of the three options presented for USIM modification to support priority service, option #1 is preferred because it does not impact existing EFs. There is no integration issue between eMLPP and PS supporting networks. If PS marking is enabled then network configured priority can be used. The structure of the $EF_{eMLPP}$ is described in Third Generation Partnership Project Technical Standard (3GPP TS) 31.102 V13.1.0, the disclosure of which is incorporated herein by reference in its entirety.

RRC Changes

In order to support end-to-end priority service, the following three options illustrate exemplary modifications or changes to the RRC interface to support end-to-end priority service as described herein. The RRC interface is the interface between the eNode B and the MME. Messages in the RRC information include IEs that carry information for radio interface resource control.

In the first option, option #1, a new IE is added in RRC messaging to carry end-to-end priority user and priority level information. In this IE, PS_Marking may be mandatory and priority level information may be optional. If the priority level is not present then a system configured default priority can be used at the eNode B and the MME until the HSS communicates the subscriber priority to the eNode B and the MME.

In another option, option #2, end-to-end priority user and priority level information may be communicated in a NAS message (e.g. an Attach Request request) However, if the eNode B does not process the NAS message, the eNode B will not be able to learn of the priority information.

In a yet another option, option #3, the RRC Attach Type IE (carried in an attach request message) may be modified to carry end-to-end priority user and priority level information as well as evolved packet services (EPS) as the requested attachment type. Carrying priority service information as part of the attach type IE would require more effort from different nodes to process same type of calls with different priorities.

S1-Application Protocol (S1-AP) Changes

In order to support end-to-end priority service, the following changes may be made to the S1-AP interface.
S1-AP: Initial UE Option 1: Add PS marking and PS priority level info to an existing S1-AP protocol message. The S1-AP protocol is used on the interface between the eNode B and the MME. The end-to-end priority user indicator and the priority level information may be added to an existing message, such as an initial UE message transmitted from the eNode B to the MME.

As with the interface examples described above, PS marking (end-to-end priority user indicator) may be mandatory and the priority level may be optional.

Option 2: Carry forward the PS info from a non-access stratum (NAS) message. NAS messaging is used between the eNode B and the MME to carry UE-MME signaling over the S1 interface. Such signaling may be used to carry end-to-end priority user and priority level information received from the UE from the eNode B to the MME. The MME may then transport the received priority information to other network nodes, such as the HSS.

Additional details regarding the S1-AP interface can be found in 3GPP TS 36.413, the disclosure of which is incorporated herein by reference in its entirety.

Diameter Changes

In order to support end-to-end priority service, the following changes may be made to Diameter interfaces in the network.

Once PS marking is validated by the HSS, then all Diameter and GTP messages should carry PS marking information in all messages mandatorily.

PS marking in Diameter messaging can be implemented in at least the following two ways:

Option #1: Set reserved bit in command flag in Diameter header. Currently there are 4 reserved bits in the command flag as shown below:

TABLE 3

Command Flag for Diameter Header

| | | | Bit | | | | |
|---|---|---|---|---|---|---|---|
| 0 | 1 | 2 | 3 | 4 | 5 | 6 | 7 |
| Value R | P | E | T | R | r | r | r |

In the command flag, the last 4 bits are reserved (r). One of these reserved bits can be used to store the end-to-end priority user indicator. One advantage of using a bit in the Diameter command flag in the Diameter header to store the end-to-end priority user indicator is that the command flag can be parsed quickly and used to either prioritize or discard messages during congestion. One disadvantage of this approach is that a reserved bit is used. Additional details of the Diameter header and the command flag can be found in IETF RFC 6733, the disclosure of which is incorporated herein by reference in its entirety.

In an alternate implementation, rather than using a bit in the command flag of the Diameter header to carry the end-to-end priority user indicator, a new priority service AVP may be used. The new AVP may indicate whether a message is associated with a priority user or not. The AVP may be close to the header to reduce parsing time. An advantage to this approach over using a reserved bit is that a reserved bit is saved. A disadvantage is that additional parsing time may result.

To carry the priority level information, a new AVP, PS_Priority_Level can carry the PS priority user information. A disadvantage to this approach is that a new AVP support may be required. An advantage of tis approach is that PS priority level information can be segregated from Diameter message priority and can be taken in to account while setting the message priority. For a vendor/network specific implementation, the PS_Priority_Level AVP should be read to determine the message priority level so that it should be higher than public priority level.

In an alternate implementation, rather than defining a new AVP to carry priority level information, an existing AVP can be used. In one example, the existing AVP that is reused is the Diameter routing message priority (DRMP) AVP. An advantage to this approach is that support for a new AVP does not need to be implemented. A disadvantage of this approach is that PS users have different priority level (1 to n) and each network and vendor may have different interpretation of priority levels. So it would require a recommendation to use a fixed range for PS users which should be higher that public users.

If a Diameter message is not carrying a DRMP priority level or PS priority level then the receiving node can fall back to default options:
1) Use Max-1 priority as default priority for the PS message Use (Max/2)+1 as default priority
2) Use a spec recommended value as default priority
3) Use user configurable priority as default options
4) A new Default_PS_Priority_LEVEL AVP can be sent in capabilities exchange request/capabilities exchange answer (CER/CEA) message and communicating nodes can use a max of CER and CEA. If only one node sends it than that priority can be used as default for other node as well.
   1) Variation: Node A sends priority info to node B. If node B has default priority, then ignore this AVP. Else the node B shall pick up node A priority received in CEx message.

Note: Max is the maximum priority level used by the Diameter node.

General Packet Radio Service Tunneling Protocol Version 2 (GTPv2) Changes

In order to support end-to-end priority service, the following changes must be made to GTP interfaces in the network.

Option #1: Set spare bit in header to carry the end-to-end priority user indicator. Table 4 shown below illustrates an exemplary structure of a GTPv2 header.

TABLE 4

GTPv2 Header

| Octets | Bits | | | | | | | |
|---|---|---|---|---|---|---|---|---|
| | 8 | 7 | 6 | 5 | 4 | 3 | 2 | 1 |
| 1 | Version | | P | T | Spare | Spare | | Spare |
| 2 | Message Type | | | | | | | |
| 3 | Message Length (1$^{st}$ Octet) | | | | | | | |
| 4 | Message Length (2$^{nd}$ Octet) | | | | | | | |
| m to k (m + 3) | If T flag is set to 1, then TEID shall be placed into octets 5-8. Otherwise TEID filed is not present at all. | | | | | | | |
| n to (n + 2) | Sequence Number | | | | | | | |
| (n + 3) | Spare | | | | | | | |

In Table 4, octets n+3 in the header contain spare bits. One of the spare bits can be used for PS marking. An advantage of using a header bit for PS marking is that header bits can be quickly processed to identify messages associated with priority and non-priority users during periods of congestion. A disadvantage of using a spare or reserved bit is that these bits are supposed to remain reserved according to the GTPv2 specification. Further details about the GTPv2 header can be found in 3GPP TS 29.274, the disclosure of which is incorporated herein by reference in its entirety.

Option #2: New IE Support

A new IE, referred to as Priority_Service_Info, may be used to carry the information to indicate whether a GTPv2 message is associated with a priority user or not. This IE may be kept close to the GTPv2 header. An advantage of this approach is that a reserved bit is saved. A disadvantage of utilizing a new IE is that additional parsing time in locating and parsing the IE may result.

Like the end-to-end priority user information, the priority level information may also be carried and a GTPv2 IE separate from the GTPv2 header. In one example, a new IE, referred to as PS_Priority_Level can carry the priority level information. A disadvantage to this approach is that support for yet another new IE may be required. An advantage to this approach is that priority level information can be segregated from the end-to-end user priority and can be taken in to account while setting the message priority. For vendor/network specific implementations, the PS_Priority_Level IE may be read to determine the message priority level so that it should be higher than the priority level for public (non-emergency) messages. The PS_Priority Level IE can be grouped with the new IE to support end-to-end user priority. Defining a new IE to carry the priority level information is cleaner than using an existing IE, such as the enhanced multi-level precedence and preemption (ML) IE, to carry such information because doing so keeps eMLPP and PS level IEs separate.

In an alternate implementation, rather than defining a new IE to carry priority level information on the GTPv2 interface, an existing IE can be re-used to carry such information. In one example, the existing IE that is reused may be the message priority service evolved packet system (MPS EPS) IE. An advantage of this approach is that support for a new IE is not required. A disadvantage is that there is no segregation on e ELMPP and PS IEs, although only one will be in use.

Further details on MPS EPS priority can be found in 3GPP TS 23.401, the disclosure of which is incorporated herein by reference in its entirety.

Node Support

As indicated above, network nodes may also be modified to support end-to-end priority service. The following sections specify modifications that may be made to each node in the network to support end-to-end priority service as described herein.

MME

If the MME receives data indicating that the UE is a PS subscriber, the MME may implement the following:

1) Identity request and response messaging will be performed on the NAS with priority marking.
2) For PS marked USIM: ME-Identity-Check-Request/Answer (ECR/ECA) in the Diameter messages should carry PS marking. If the user is blocked or invalid, the vendor may decide based on PS marking whether to allow or drop the call.
3) After the HSS communicates PS marking and PS priority level to the MME, then a verification is performed. If subscription information does not match PS marking from the UE, then the MME may drop the call or allow the call to continue as a public call. Additionally, Priority_Level Info may be overwritten by the HSS.

HSS

The HSS may be modified to include support to save PS_Marking and PS_Priority_Level Info in the subscription profile for a UE. The HSS may determine whether priority specified in a user's subscription matches the end-to-end priority user indicator and priority level information in a received message and may override the priority in the message if the priority in a user's subscription does not match.

SPR

The SPR may save PS marking and PS priority level information in the subscription information and communicate the same to the PCRF. The SPR may also communicate priority information associated with a user's subscription to the PCRF to allow the PCRF to make priority override decisions.

PCRF

The PCRF may use the PS marking and priority level information received from SPR and apply the received information in overriding the HSS values received from PGW. Additionally, the PCRF may communicate the PS marking and priority level information back to the network during IP CAN session establishment. Other nodes can use the PS marking and priority level information received from the PCRF to overwrite/disable message priority values in the network.

DSR or Diameter Routing Agent (DRA)

A DSR or DRA may be modified to recognize end-to-end priority user indicators and priority level information, either stored in a Diameter header or a Diameter AVP. The DSR may also be configured to include this information in outbound messages generated by the DSR that are associated with the same session or transaction as a received message that included the end-to-end priority user indicator and priority level information. The DSR may also be configured to treat messages with the priority indicated by the priority user indicator and/or the priority level information.

For example, messages with a priority user indicator may be routed with higher priority than messages without such an indicator.

SGW and PGW

The SGW and PGW may each be modified to recognize priority user indicators and priority level information in received messages, to store associations between the indicators and the corresponding session or transaction, and to include the end-to-end priority user indicator and priority level information in outbound messages transmitted by the SGW or PGW that are associated with the same session as message that communicated such information to the SGW or PGW.

Although the subject matter described herein relates to LTE and subsequent generation networks, the end-to-end priority service may also be extended to other networks that communicate with such networks. For example, end-to-end priority service may be extended to IP multimedia subsystem (IMS) networks, using the same priority user indicator and priority level information described herein.

To extend the end-to-end priority service described herein to IMS networks, the same PS_MARKING and PS_PRIORITY_LEVEL support described herein can be extended to IMS networks to provide uniform support across networks and efficient processing during congestion. Thus, network node 300 illustrated in FIG. 2 may be an IMS network node that performs the steps described herein for supporting end-to-end priority service. In an IMS network, the INVITE message from the UE may carry PS_MARKING and PS_PRIORITY_Level configured and may be communicated to IMS network from that point. The HSS in the IMS network may verify and can override information sent from the UE. This behavior is similar to that described above for the LTE network.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for supporting end-to-end priority service in long term evolution (LTE) or subsequent generation networks, the method comprising:
   at a network node configured to operate in an LTE or subsequent generation network:
      receiving a message associated with a communications session or transaction in a network, the message including an end-to-end priority user indicator identifying a user associated with the session or transaction as a priority user, wherein the end-to-end priority user indicator comprises a parameter that is distinct from an international mobile subscriber identity (IMSI) and a mobile subscriber integrated services digital network (MSISDN) number, inserted in a radio resource control (RRC) connection request message by a user equipment (UE) device, and recognized by at least an evolved node B (eNode B) and a mobility management entity (MME) as identifying a priority user;
      treating the session or transaction with a priority corresponding to the end-to-end priority user indicator; and
      including the end-to-end priority user indicator in subsequent messages transmitted by the network node that are associated with the same session or transaction as the received message.

2. The method of claim 1 wherein the network node comprises a Diameter signaling router (DSR) and wherein the received message comprises an update location request (ULR) carrying the end-to-end priority user indicator, and wherein treating the session or transaction with a priority corresponding to the end-to-end priority user indicator includes routing the ULR message with a message priority corresponding to the end-to-end priority user indicator in the ULR message.

3. The method of claim 1 wherein the network node comprises a home subscriber server (HSS), wherein the received message comprises an update location request (ULR) message including the end-to-end priority user indicator and wherein the method further comprises verifying whether the end-to-end priority user indicator in the received message matches a priority assigned to the user.

4. The method of claim 1 wherein the network node comprises a policy and charging rules function (PCRF) and wherein the received message includes a create connection request-initial (CCR-I) message and wherein including the end-to-end priority user indicator in subsequent messages comprises including the end-to-end priority user indicator in a user data request (UDR) message transmitted to a subscription profile repository (SPR).

5. The method of claim 4 wherein the PCRF determines whether to override a priority level corresponding to the end-to-end priority user indicator based on real time network usage information.

6. The method of claim 1 wherein the received message further includes priority level information in addition to the end-to-end priority user indicator.

7. The method of claim 1 wherein the received message comprises a Diameter message and wherein the end-to-end priority user indicator is stored in a command flag in a Diameter header or in an attribute value pair outside of the Diameter header.

8. The method of claim 1 comprising storing an association between the end-to-end priority user indicator and the session or transaction.

9. The method of claim 1 wherein the network node comprises an IP multimedia subsystem (IMS) network node and wherein the received message comprises a session initiation protocol (SIP) invite message.

10. A system for supporting end-to-end priority service in long term evolution (LTE) or subsequent generation networks, the system comprising:
   a network node configured to operate in an LTE or subsequent generation network, the network node including:
      at least one processor;
      a memory accessible by the at least one processor;
      an end-to-end priority service support module stored in the memory and executable by the at least one processor for:
         receiving a message associated with a communications session or transaction in a network, the message including an end-to-end priority user indicator identifying a user associated with the session or transaction as a priority user, wherein the end-to-end priority user indicator comprises a parameter that is distinct from an international mobile subscriber identity (IMSI) and a mobile subscriber integrated services digital network (MSISDN) number, inserted in a radio resource control (RRC) connection request message by a user equipment (UE) device, and recognized by at least an evolved node B (eNode B) and a mobility management entity (MME) as identifying a priority user;

treating the session with a priority corresponding to the end-to-end priority user indicator; and including the end-to-end priority user indicator in subsequent messages transmitted by the network node that are associated with the same session or transaction as the received message.

11. The system of claim 10 wherein the network node comprises a Diameter signaling router (DSR) and wherein the received message comprises an update location request (ULR) carrying the end-to-end priority user indicator, and wherein treating the session or transaction with a priority corresponding to the end-to-end priority user indicator includes routing the ULR message with a message priority corresponding to the end-to-end priority user indicator in the ULR message.

12. The system of claim 10 wherein the network node comprises a home subscriber server (HSS), wherein the received message comprises an update location request (ULR) message including the end-to-end priority user indicator and wherein the end-to-end priority user support module is configured to verify whether the end-to-end priority user indicator in the message matches a priority assigned to the user.

13. The system of claim 10 wherein the network node comprises a policy and charging rules function (PCRF) and wherein the received message includes a create connection request-initial (CCR-I) message and wherein including the end-to-end priority user indicator in subsequent messages comprises including the end-to-end priority user indicator in a user data request (UDR) message transmitted to a subscription profile repository (SPR).

14. The system of claim 13 wherein the PCRF determines whether to override a priority level corresponding to the priority user indicator based on real time network usage information.

15. The system of claim 10 wherein the received message further includes priority level information in addition to the priority user indicator.

16. The system of claim 10 wherein the received message comprises a Diameter message and wherein the priority user indicator is stored in a command flag in a Diameter header or in an attribute value pair outside of the Diameter header.

17. The system of claim 10 wherein the received message includes a general packet radio service tunneling protocol (GTP) message carrying the end-to-end priority user indicator.

18. The system of claim 10 wherein the end-to-end priority service support module is configured to store an association between the end-to-end priority user indicator and the session or transaction.

19. The system of claim 10 wherein the network node comprises an IP multimedia subsystem (IMS) node and wherein the received message comprises a session initiation protocol (SIP) invite message.

20. A non-transitory computer readable medium comprising computer executable instructions that when executed by at least one processor of a computer cause the computer to perform steps comprising:

at a network node configured to operate in an LTE or subsequent generation network:

receiving a message associated with a communications session or transaction in a network, the message including an end-to-end priority user indicator identifying a user associated with the session or transaction as a priority user, wherein the end-to-end priority user indicator comprises a parameter that is distinct from an international mobile subscriber identity (IMSI) and a mobile subscriber integrated services digital network (MSISDN) number, inserted in a radio resource control (RRC) connection request message by a user equipment (UE) device, and recognized by at least an evolved node B (eNode B) and a mobility management entity (MME) as identifying a priority user;

treating the session or transaction with a priority corresponding to the end-to-end priority user indicator; and including the end-to-end priority user indicator in subsequent messages transmitted by the network node that are associated with the same session or transaction as the received message.

* * * * *

UNITED STATES PATENT AND TRADEMARK OFFICE
CERTIFICATE OF CORRECTION

PATENT NO. : 10,321,300 B2  
APPLICATION NO. : 15/217899  
DATED : June 11, 2019  
INVENTOR(S) : Juneja Page 1 of 1

It is certified that error appears in the above-identified patent and that said Letters Patent is hereby corrected as shown below:

In the Drawings

On sheet 1 of 3, in FIG. 1, Line 5, delete "SUBCRIBER" and insert -- SUBSCRIBER --, therefor.

On sheet 1 of 3, in FIG. 1, Line 20, delete "OVERIDE" and insert -- OVERRIDE --, therefor.

On sheet 3 of 3, in FIG. 3, under Reference Numeral 302, Line 1, delete "OVERIDE" and insert -- OVERRIDE --, therefor.

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*